J. C. BARR.
DEVICE FOR CLEANING RAILS.
APPLICATION FILED JULY 23, 1915.
1,176,021.
Patented Mar. 21, 1916.
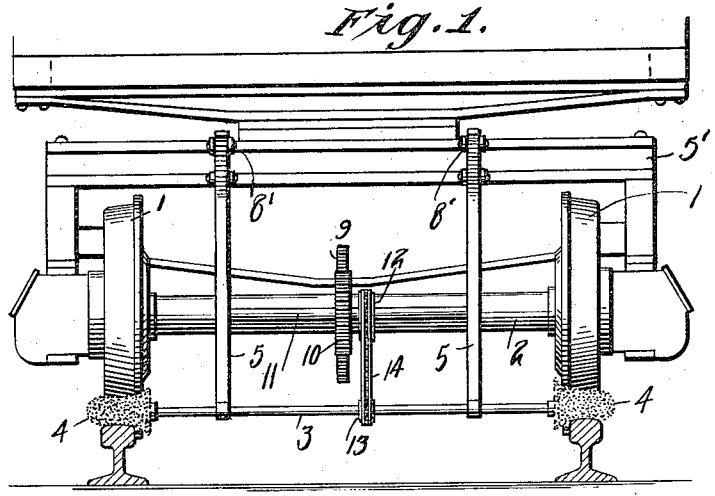
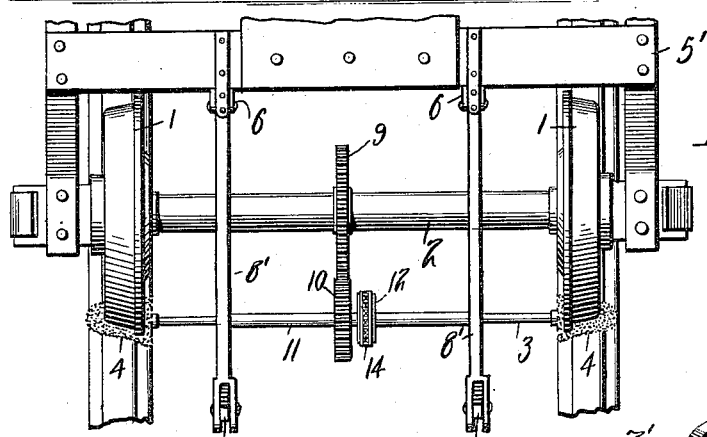
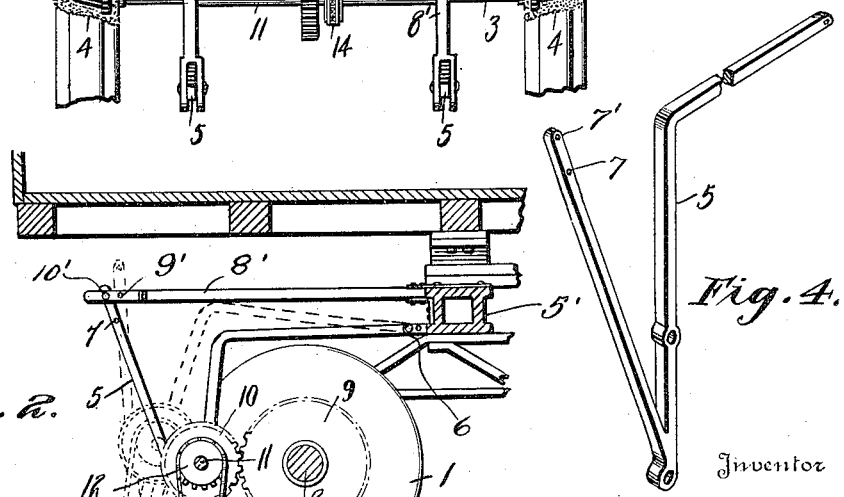
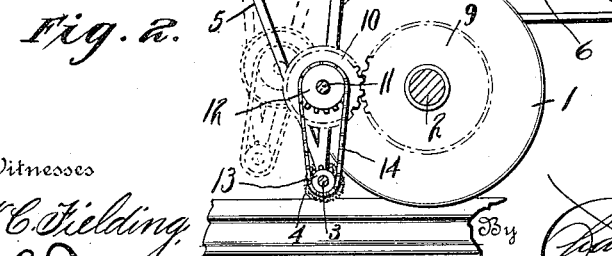

UNITED STATES PATENT OFFICE.

JOHN C. BARR, OF WARREN, PENNSYLVANIA.

DEVICE FOR CLEANING RAILS.

1,176,021. Specification of Letters Patent. Patented Mar. 21, 1916.

Application filed July 23, 1915. Serial No. 41,574.

*To all whom it may concern:*

Be it known that I, JOHN C. BARR, a citizen of the United States, residing at Warren, in the county of Warren, State of Pennsylvania, have invented certain new and useful Improvements in Devices for Cleaning Rails; and I do hereby declare the following to be a full, clear, and exact description of the invention, such as will enable others skilled in the art to which it appertains to make and use the same.

This invention relates to a device for cleaning rails.

An object of the invention resides in the provision of a device by means of which the rails of a railway may be cleaned of snow or ice by the car as it advances.

A further object of the invention resides in the provision of a device which may be rendered operative or inoperative at the will of the operator.

With these and other objects in view, such as will appear as the description progresses, my invention comprises the combination and arrangement of parts as set forth in and falling within the scope of the appended claim.

Referring to the drawing: Figure 1 is a front elevation of my device. Fig. 2 is a vertical sectional view. Fig. 3 is a plan view. Fig. 4 is a fragmental detail of one of the hangers.

Referring to the drawing wherein like parts are indicated by like characters throughout the several views: I have disclosed a portion of a car truck which is supported by wheels 1 on an axle 2. In order that the snow or ice may be cleaned from the rails as the wheels 1 advance, I have provided a horizontally extending shaft 3 on each end of which is detachably mounted a brush 4 which is tapered from its inner end to its outer end and is adapted to contact with the adjacent rail. These brushes are detachable and interchangeable. This shaft 3 is mounted in a pair of hangers 5 which are V-shaped and are hinged to a beam 5' on the truck, as at 6. One end of each of these hangers is provided with a pair of openings 7 and 7'. Extending forwardly from the beam 5' are arms 8' which have openings 9' and 10' therein. A suitable set screw extends through the openings 7' and 10' when the brushes are in contact with the rails and is adapted to be inserted through the openings 7 and 9' when the brushes are raised from the rails. Thus the brushes may be raised from or lowered to the rails and will be held positively in each of said positions. In order that the brushes may be rotated, I have provided a gear 9 which is secured to the axle 2 and meshes with a second and smaller gear 10 which is secured to a shaft 11, which shaft is mounted on the hangers 5 and extends therebetween. Secured to the shaft 11 is a sprocket 12 and secured to the shaft 3 is a sprocket 13 which is relatively smaller than the sprocket 12. A sprocket chain 14 passes over these sprockets 12 and 13 and causes the brushes to move in a direction opposite to that of the rotation of the wheels 1.

It will thus be seen that I have provided a very simple device which may be attached to a car so that the rails will be freed from snow or ice during the advance of the car and I have so constructed the device that the cleaning brushes may be raised from the ground and held in such position so that when it is not necessary to have them in operation they will not be in contact with the rails.

While I have illustrated and described a particular embodiment of my invention, it has merely been for the sake of convenience and I do not wish to be limited to that particular embodiment as it is obvious that numerous changes may be made within the scope of the appended claim.

What I claim is:—

In a rail cleaning device, the combination with a pair of V-shaped hangers adapted to be hinged to a car truck at certain of their ends, means for detachably securing the other ends to the truck, a plurality of brushes carried by said hangers and means for imparting rotative movement to said brushes.

In testimony whereof, I affix my signature, in the presence of two witnesses.

JOHN C. BARR.

Witnesses:
 VICTOR H. OFFERLE,
 ARTHUR BARR.

Copies of this patent may be obtained for five cents each, by addressing the "Commissioner of Patents, Washington, D. C."